United States Patent
Fletcher

(10) Patent No.: US 9,624,832 B2
(45) Date of Patent: Apr. 18, 2017

(54) HEAT EXCHANGE ARRANGEMENT

(71) Applicant: ROLLS-ROYCE PLC, London (GB)

(72) Inventor: Paul Fletcher, Rugby (GB)

(73) Assignee: ROLLS-ROYCE plc, London (GB)

( * ) Notice: Subject to any disclaimer, the term of this patent is extended or adjusted under 35 U.S.C. 154(b) by 430 days.

(21) Appl. No.: 14/229,137

(22) Filed: Mar. 28, 2014

(65) Prior Publication Data

US 2014/0341704 A1    Nov. 20, 2014

(30) Foreign Application Priority Data

May 16, 2013   (GB) .................................. 1308788.7

(51) Int. Cl.
| F02C 7/14 | (2006.01) |
| F02K 3/115 | (2006.01) |
| F02C 7/141 | (2006.01) |

(52) U.S. Cl.
CPC .............. *F02C 7/141* (2013.01); *F02K 3/115* (2013.01); *F05D 2260/213* (2013.01); *Y02T 50/676* (2013.01)

(58) Field of Classification Search
CPC .... F02C 7/141; F02K 3/115; F05D 2260/213; Y02T 50/676
See application file for complete search history.

(56) References Cited

U.S. PATENT DOCUMENTS

| 3,842,597 A | * | 10/1974 | Ehrich ..................... F02C 7/141 |
| | | | 60/226.1 |
| 6,134,880 A | * | 10/2000 | Yoshinaka .............. F02C 7/143 |
| | | | 60/226.1 |
| 2001/0054354 A1 | | 12/2001 | Baudat et al. |
| 2008/0230651 A1 | | 9/2008 | Porte |
| 2012/0216545 A1 | * | 8/2012 | Sennoun ................ B64D 13/06 |
| | | | 60/772 |

FOREIGN PATENT DOCUMENTS

| DE | 103 55 353 A1 | 7/2005 |
| EP | 0 469 825 A2 | 2/1992 |
| EP | 1 795 708 A2 | 6/2007 |
| EP | 2 604 825 A2 | 6/2013 |
| WO | WO 2014/051678 A1 | 4/2014 |

OTHER PUBLICATIONS

European Search Report issued in Application No. EP 14162192 dated Sep. 3, 2014.
Nov. 14, 2013 Search Report issued in United Kingdom Patent Application No. 1308788.7.

* cited by examiner

*Primary Examiner* — Audrey K Bradley
(74) *Attorney, Agent, or Firm* — Oliff PLC

(57) ABSTRACT

A heat exchange arrangement for a gas turbine engine. The arrangement includes a first conduit for an engine component cooling fluid and a second conduit for a second fluid. The arrangement further includes a heat exchange portion in which fluids flowing through the first and second conduits are in a heat exchange relationship. A valve is provided, which is configured to moderate the mass flow rate of one of the fluids through the heat exchange portion. The arrangement includes divert valve in the first conduit which diverts flow to the second conduit as the flow in the second conduit is moderated to reduce thermal shock in the heat exchange portion.

13 Claims, 1 Drawing Sheet

HEAT EXCHANGE ARRANGEMENT

FIELD OF THE INVENTION

The present invention relates to a heat exchange arrangement and a method of controlling a heat exchange arrangement, and particularly to a heat exchange arrangement for a gas turbine engine.

BACKGROUND TO THE INVENTION

FIG. 1 shows a gas turbine engine 10 comprising an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle. Each turbine 22, 24, 26 comprises rotating turbine rotors 27 and stationary nozzle guide vanes (NGVs) 29. A nacelle 30 surrounds the gas turbine engine 10 and defines, in axial flow B, a bypass duct 32.

The air exiting the combustor 20 is generally at a very high temperature, which generally approaches or exceeds the melting point of the materials used in turbine rotors 27 and NGVs 29. Consequently, relatively cool compressor air from the compressors 16, 18 is used to cool components downstream of the combustor such as the turbine rotors 27 and NGVs 29, thereby preventing damage to the components, and increasing their operating life. The compressor air is passed through an interior of the rotors 27 and/or NGVs 29, and out through holes to provide a cooling air film.

In gas turbine engine design, there is a continuing requirement for improved specific fuel consumption. Specific fuel consumption can be improved (i.e. reduced) by increasing the temperature of the combustion products exiting the combustor (known as the turbine entry temperature (TET). Alternatively or in addition, specific fuel consumption can be improved by increasing the pressure ratio provided by the compressors 14, 16, 18.

However, as TET increases, a larger mass flow of cooling air is required in order to maintain the components downstream of the combustor below their maximum temperature. Furthermore, as the compression ratio of the compressed air increases, so does the temperature of the compressor air. In some cases, the compressor air provided by the high pressure compressor 18 can reach temperatures in excess of 700° C. Consequently, the cooling capacity (i.e. the amount of heat that can be removed by the air from a hot fluid at a given temperature) of a given mass of air compressed by the compressors 16, 18 falls as the compression ratio increases, while the requirement for cooling increases as TET increases. Ultimately, a limit is reached whereby providing further cooling air is ineffective at restoring component operating life, and neither compression ratio nor TET can be increased. Furthermore, air used in cooling is less able to take part in the thermodynamic cycle of the engine. Consequently, excessive use of compressor air for cooling may result in an increase in specific fuel consumption at high TET or compression ratios.

One way to overcome this problem is to cool compressor air used for cooling by passing some or all of the cooling air through a heat exchanger such that the cooling air is in heat exchange relationship with a secondary heat exchange medium comprising a relatively cooler fluid. In a gas turbine engine for an aircraft, suitable secondary heat exchange mediums may comprise air from the bypass duct 32, or fuel used to power the gas turbine engine, such as liquid hydrocarbon based fuel.

One example of such an arrangement is described in EP 0469825 in which bypass air is used as the secondary heat exchange medium. However, repeated sudden exposure of the heat exchanger to large thermal gradients, such as will occur when either cooling air or secondary heat exchange medium is bypassed around the heat exchanger, can induce high thermal stresses in the heat exchanger. This may cause sudden or eventual failure of the heat exchanger after a limited number of cycles. Consequently, there is a requirement to increase the longevity of the heat exchanger in such arrangements.

The present invention seeks to address some or all of the above problems.

SUMMARY OF THE INVENTION

According to a first aspect of the present invention, there is provided a heat exchange arrangement for a gas turbine engine, the heat exchange arrangement comprising: a first conduit for an engine component cooling fluid and a second conduit for a second fluid, a heat exchange portion in which fluids flowing through the first and second conduits are in a heat exchange relationship; a valve configured to moderate the mass flow rate of the fluid in the second conduit through the heat exchange portion; and a divertor valve configured to divert fluid from the first conduit into the second conduit upstream of the heat exchanger portion.

Accordingly, the invention provides a heat exchange arrangement in which large thermal gradients which may otherwise damage the heat exchange arrangement are prevented by controlling diversion of warmer fluid from the first conduit into the second conduit at a position upstream of the heat exchanger portion. This ensures that the fluid in the second conduit initially reaches the heat exchanger at a warmer temperature to eliminate or reduce thermally induced stresses in the heat exchanger, which in turn increases the longevity of the heat exchange arrangement. On the other hand, the arrangement is capable of reacting as quickly as possible to cooling requirements, thereby increasing cooled component life, while preventing damage to the heat exchange arrangement from occurring.

The divert valve may be located downstream of the heat exchange portion. The second fluid may comprise any of air, fuel or engine oil, and the second fluid may comprise bypass air. Where the second fluid comprises bypass air, the second fluid conduit may be located within the bypass duct of the gas turbine engine.

A controller may be configured to control the divert valve in response to a signal to moderate the mass flow rate of fluid in the second conduit. The flow may be diverted as the mass flow rate in the second conduit is moderated or before the mass flow rate in the second conduit is moderated. The controller may be set to stop the diverted flow after a predetermined time period or once the temperature of fluid in the first conduit reaches a predetermined temperature after the divert valve has opened.

The mass flow rate in the first conduit may be increased temporarily whilst the flow is being diverted so that the net flow to the cooled components downstream of the divertor valve is unchanged.

In a preferred embodiment, a temperature sensor may be located within an outlet of the first fluid conduit. Accordingly, the temperature sensor senses the temperature of the component cooling fluid after it is cooled by the second fluid.

Preferably, the valve may comprise a butterfly valve. Butterfly valves have been found to be particularly suitable for the invention, since they are suitable for accurately controlling the flow rate of a fluid.

The second fluid conduit may comprise an outlet downstream of the heat exchanger portion, the outlet being configured to accelerate fluid flowing out of the outlet. Such an arrangement is particularly suitable where the second fluid comprises bypass duct air. Accordingly, the velocity of the second fluid can be accelerated at the outlet to match the velocity of air in the bypass duct.

DETAILED DESCRIPTION

Figure 1:
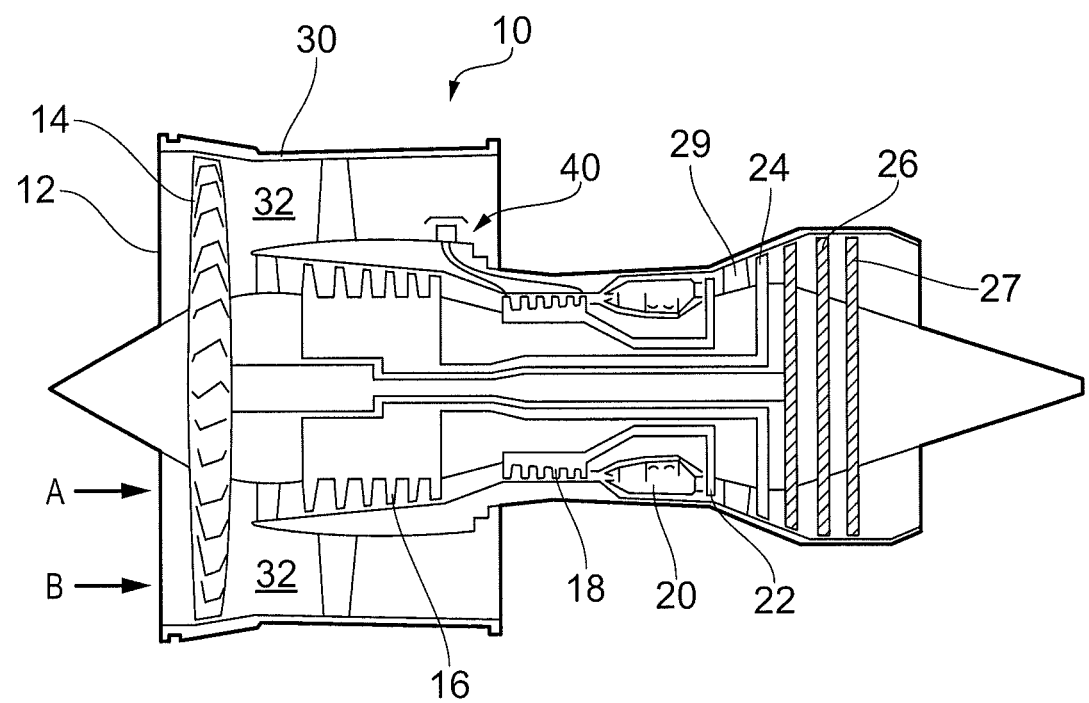
FIG. 1 is a diagrammatic cross sectional view of a gas turbine engine.

FIG. 1 shows a gas turbine engine 10 comprising an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle. Each turbine 22, 24, 26 comprises rotating turbine rotors 27 and stationary nozzle guide vanes (NGVs) 29. A nacelle 30 surrounds the gas turbine engine 10 and defines, in axial flow B, a bypass duct 32.

Figure 2:
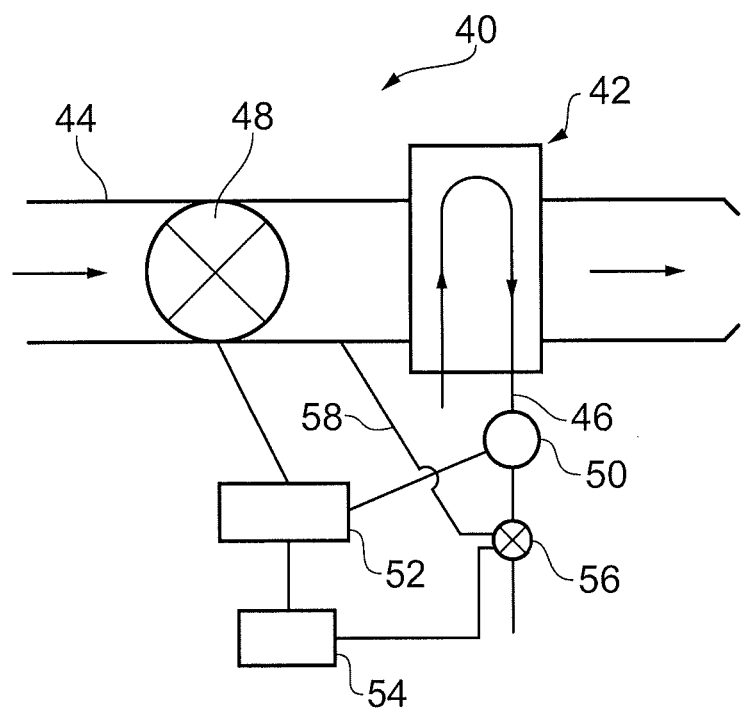
FIG. 2 is a diagrammatic cross sectional view of a heat exchange arrangement.

The gas turbine engine 10 includes a heat exchange arrangement 40, as shown diagrammatically in further detail in FIG. 2. The arrangement comprises a first conduit 46 for an engine component cooling fluid. The engine component cooling fluid comprises high pressure compressor air supplied by the high pressure compressor 18, though air could alternatively be supplied from the intermediate pressure compressor 16. The arrangement also comprises a second conduit 44 for a second fluid. The second fluid comprises bypass air supplied from the bypass duct 32. The second conduit 44 is located within the bypass duct 32 such that when the engine 10 is in operation, bypass air can flow directly into an inlet of the second conduit 44. The temperature of bypass air entering the inlet varies from around -40° C. to around 80° C. during operation.

The heat exchange arrangement 40 comprises a heat exchange portion 42 through which the fluid in the first and second conduits 44, 46 pass. Fluids flowing through the first and second conduits 44, 46 in the heat exchange portion 42 are in a heat exchange relationship such the relatively hot high pressure compressor air flowing through the first conduit 46 is cooled by the relatively cool bypass air flowing through the second conduit 44. The heat exchange portion 42 comprises a matrix type heat exchanger formed of a material having high structural strength and suitable thermal conductivity such as steel, inconel, aluminium or titanium. Examples of suitable heat exchangers include plate-fin, plate-plate or tube type depending on pressure and temperature requirements. The described embodiment comprises a U-tube cross-counterflow arrangement. such an arrangement is preferred for high temperature and high pressure applications with moderate flow and heat exchange requirements. Other suitable heat exchanger arrangements comprise cross, counter, parallel or cross-counter flow arrangements, which may be suitable in situations having different flow, temperature and heat exchange requirements.

The arrangement 40 further comprises a valve 48 located within the second conduit 44, and configured to moderate the flow rate of the second fluid through the second conduit 44. In this embodiment, the valve 48 is located upstream of the heat exchange portion 42, though the valve 48 could alternatively be located downstream of the heat exchange portion 42, provided it is configured to moderate the flow rate of the second fluid through the second conduit 44. The valve 48 is actuable between open and closed positions and is thereby configured to moderate the mass flow rate of the bypass air flowing through the second conduit 44 in use. The valve 48 could be of any suitable type which can be operated between an open position in which fluid flow is substantially unrestricted, and a closed position in which fluid flow is substantially stopped, and preferably to positions in between open and closed positions. In the described embodiment, the valve 48 comprises a butterfly valve.

The arrangement 40 includes a temperature sensor 50 which is configured to sense the temperature of the compressor air after it has passed through the heat exchange portion 42, i.e. in the first fluid flow, downstream of the heat exchange portion 42. The temperature sensor 50 comprises any sensor capable of producing an electrical signal in response to a temperature change, and in the described embodiment comprises a thermocouple.

The temperature sensor 50 is in signal communication with a valve controller 52. The valve controller 52 is in turn in signal communication with the valve 48, and is configured to provide a signal to actuate the valve between the open and closed positions, and preferably to intermediate positions, to increase or reduce the mass flow rate through the second conduit 44. The valve controller 52 is also in signal communication with an engine control unit (ECU) 54, which is configured to send a signal to the valve controller 52 to command a desired heat exchanger outlet compressor air temperature.

A valve 56 is provided in the heat exchanger outlet line 46 from which a portion can be diverted through conduit 58 into the cold stream 44. The conduit may open into the conduit downstream or upstream of the valve 48 and the volume of hot fluid diverted through valve 56 is variable depending on one or more of the volume flow through valve 48, the temperature of the fluid in conduit 44, the time elapsed after the opening of valve 48, and the temperature of the fluid sensed by sensor 50.

During operation of the engine 10, air is compressed by the compressors 16, 18, and a portion of the air from the high pressure compressor 18, or possibly the intermediate compressor 16, is directed through the first conduit 46 to the heat exchange portion 42. The fan 14 is also operated, such that air flows through the duct 32. A portion of this fan air is directed into the second fluid conduit 44 through the inlet.

During operation of the engine 10, the temperature of the air cooled components will vary somewhat, and varying cooling rates provided by the cooling air (i.e. flow rates or temperatures of the first fluid) may therefore be required. The amount and temperature of cooling air is regulated by the ECU 54. During operation, a signal is sent from the ECU 54 to the valve controller 52 commanding an engine component coolant fluid temperature in accordance with cooling requirements calculated by the ECU 54. The engine component fluid temperature may be chosen by the ECU 54 on the basis of engine operating conditions such as turbine entry temperature (TET) in order to maintain the cooled turbine components below a predetermined temperature, or to obtain a required life of the cooled component.

The temperature sensor 50 senses the temperature of the high pressure compressor air exiting the heat exchange portion 42 of the first conduit 46 and sends a signal representative of a first sensed temperature to the valve controller 52. The valve controller 52 compares the first sensed temperature with the required temperature. Where the required temperature and the first sensed temperature differ by more than a predetermined minimum amount, the valve controller 52 actuates the valve 48 to either open the valve in response to the engine component fluid temperature requirement. For example, where the first sensed temperature is below the required temperature, the valve controller 52 sends a signal to close the valve 48, either completely, or to an intermediate position in which the flow rate through the first passage 46 is reduced, whereas where the first sensed temperature is above the required temperature, the valve controller 52 sends a signal to open the valve 48.

When the valve 48 opens the temperature difference between the air in the conduit and the heat exchanger body can cause thermal stress which can have a deleterious effect on the life of the heat exchanger. To avoid thermal shock the ECU 54 sends a signal to a controller for the valve 56 which opens the valve to divert a small bleed of fluid from the hot, higher pressure side to the fluid 44 which increases the heat exchanger cold side temperature to reduce the temperature difference and protect the heat exchanger.

The ECU can be programmed to open valve 56 before valve 48 is opened in preparation for the cold air 44 being supplied to the heat exchanger 42. Alternatively, the valves 56 and 48 may open simultaneously.

Valve 56 may be closed after a predetermined period, or once temperature sensor 50 has achieved a predetermined reading following the initial adjustment caused by the influx of the cold air.

As the flow in the conduit 46 is used to cool components in the turbine section it may be necessary for the flow in the conduit to be temporarily increased whilst the divert valve 56 is bleeding fluid into the flow in conduit 44 so that there is no net change in the cooling fluid available for cooling the components.

Accordingly, the invention provides a heat exchange arrangement having a number of advantages over prior arrangements. The architecture to reduce thermal stress on the heat exchanger is simple and requires a relatively simple control arrangement, comprising in one embodiment a thermocouple, an RC circuit, a transistor and a valve actuator. The arrangement alleviates or minimises thermal shock of the components during use, thereby increasing the life of the heat exchange arrangement. The control system can be added to an existing heat exchange arrangement, such that no modifications are required to the ECU.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

For example, different materials may be used in the construction of the heat exchange arrangement. Different first and second fluids could be employed.

The invention claimed is:

1. A heat exchange arrangement for a gas turbine engine, the heat exchange arrangement comprising:
   a first conduit for an engine component cooling fluid and a second conduit for a second fluid;
   a heat exchange portion in which fluids flowing through the first and second conduits are in a heat exchange relationship;
   a valve configured to moderate a mass flow rate of the fluid in the second conduit through the heat exchange portion; and
   a divertor valve configured to divert fluid from the first conduit into a portion of the second conduit that is upstream of the heat exchange portion.

2. A heat exchange arrangement according to claim 1, wherein the divertor valve is located downstream of the heat exchange portion.

3. A heat exchange arrangement according to claim 1, further comprising a controller configured to actuate the valve when a rate of change of temperature with respect to time of the component cooling fluid sensed by a temperature sensor is above a predetermined value.

4. A heat exchange arrangement according to claim 1, further comprising a controller configured to control the divertor valve in response to a signal to moderate the mass flow rate of the fluid in the second conduit.

5. A heat exchange arrangement according to claim 4, wherein the divertor valve is a butterfly valve.

6. A heat exchange arrangement according to claim 1, wherein the second fluid comprises air.

7. A heat exchange arrangement according to claim 6, wherein the second fluid conduit is located within a bypass duct of the gas turbine engine.

8. A gas turbine engine comprising a heat exchange arrangement according to claim 1.

9. A method of controlling a heat exchange arrangement according to claim 1, the method comprising diverting fluid from the first conduit into the second conduit upstream of the heat exchange portion.

10. A method according to claim 9, wherein fluid is diverted from the first conduit into the second conduit whilst the flow in the second conduit is modulated.

11. A method according to claim 10, wherein the flow is diverted for a predetermined period to reduce thermal shock in the heat exchange portion.

12. A method according to claim 9, wherein the fluid is diverted from the first conduit into the second conduit before the flow in the second conduit is modulated.

13. A method according to claim 12, wherein the flow is diverted for a predetermined period to reduce thermal shock in the heat exchange portion.

* * * * *